US008020103B2

(12) United States Patent
Fried et al.

(10) Patent No.: US 8,020,103 B2
(45) Date of Patent: Sep. 13, 2011

(54) USING TEMPLATES FOR ENSURING VISUAL CONSISTENCY AMONG PORTLETS

(75) Inventors: Andreas Fried, Herrenberg (DE); Richard Jacob, Ostfildern (DE); Timo Kussmaul, Boeblingen (DE); Stephan Laertz, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 828 days.

(21) Appl. No.: 11/996,927

(22) PCT Filed: Mar. 7, 2006

(86) PCT No.: PCT/EP2006/060508
§ 371 (c)(1),
(2), (4) Date: Feb. 14, 2008

(87) PCT Pub. No.: WO2007/014788
PCT Pub. Date: Feb. 8, 2007

(65) Prior Publication Data
US 2008/0235601 A1    Sep. 25, 2008

(30) Foreign Application Priority Data
Jul. 28, 2005    (EP) .................................... 05106969

(51) Int. Cl.
*G06F 15/00* (2006.01)
*G06F 13/00* (2006.01)
(52) U.S. Cl. ....................................... 715/740; 715/743

(58) Field of Classification Search .......... 715/740–743, 715/761–765, 853–855; 709/209–210
See application file for complete search history.

(56) References Cited

U.S. PATENT DOCUMENTS

| 6,327,628 | B1 * | 12/2001 | Anuff et al. .................... 719/311 |
| 2002/0118808 | A1 * | 8/2002 | Kelleher et al. .......... 379/202.01 |
| 2006/0047777 | A1 | 3/2006 | Harris et al. |
| 2006/0235935 | A1 * | 10/2006 | Ng ................................ 709/208 |

OTHER PUBLICATIONS

Diaz, O., et al., "Turning Web Applications into Portlets: Raising the Issues," Applications and the Internet, 2005 Proceedings. The 2005 Symposium on Trento, Italy (Jan. 2005), pp. 31-37.
Fred, A., et al. "The Case for Portlets", IBM DeveloperWorks, XX, XX, 1, (Feb. 2003), pp. 1-7, XP002354928.

(Continued)

*Primary Examiner* — Cao "Kevin" Nguyen
(74) *Attorney, Agent, or Firm* — Hamilton, Brook, Smith & Reynolds, P.C.

(57) ABSTRACT

The present invention relates to the field of network computing, and in particular to Web contents accessible via a Portal. It particularly relates to a method and system for controlling the layout of markup fragments of a plurality of Portlets aggregated in web pages of a web Portal. In order to provide a method with improved flexibility for the administration of a Portal which allows to generate a consistent look and feel in a Portal, it is proposed that a) a Portal control component provides a template means to said Portlets, b) wherein the template means comprises a layout specification for GUI-elements to be generated by the Portlets, and c) wherein the Portlets generate a markup code according to prescriptions comprised of said template means.

14 Claims, 6 Drawing Sheets

OTHER PUBLICATIONS

Hesmer, S., "Portlet Development Guide. Working with the Portlet API 1.1" Apr. 2, 2002, XP002267927.

Hesmer, et al. "Portlet Development Guide. Introduction to the Portlet API" [online] Jan. 30, 2002, XP002267926, [retrieved on May 31, 2006] URL: http://www.ibm.com/software/webservers/portal/library/PortletDevelopmentGuide.pdf.

Sukumar, Kondura, "Using the Portal Style Sheet Elements in a Portlet," IBM Developerworks, [online] Jan. 28, 2003, pp. 1-9, XP002383320, [retrieved on May 31, 2006] URL:http//www-128.ibm.com/developerworks/websphere/library/techarticles/0301_konduru/0301_konduru_2.html.

* cited by examiner

FIG. 1 PRIOR ART PORTAL SERVER

USING TEMPLATES FOR ENSURING VISUAL CONSISTENCY AMONG PORTLETS

RELATED APPLICATIONS

This application is the U.S. National Stage of International Application No. PCT/EP2006/060508, filed Mar. 7, 2006, published in English, which claims priority to EP 05106969.8 filed Jul. 28, 2005.

1. BACKGROUND OF THE INVENTION

1.1. Field of the Invention

The present invention relates to the field of network computing, and in particular to Web contents accessible via a Portal. It particularly relates to a method and system for controlling the layout of markup fragments of a plurality of Portlets aggregated in web pages of a web Portal.

1.2. Description and Disadvantages of Prior Art

Figure 1:
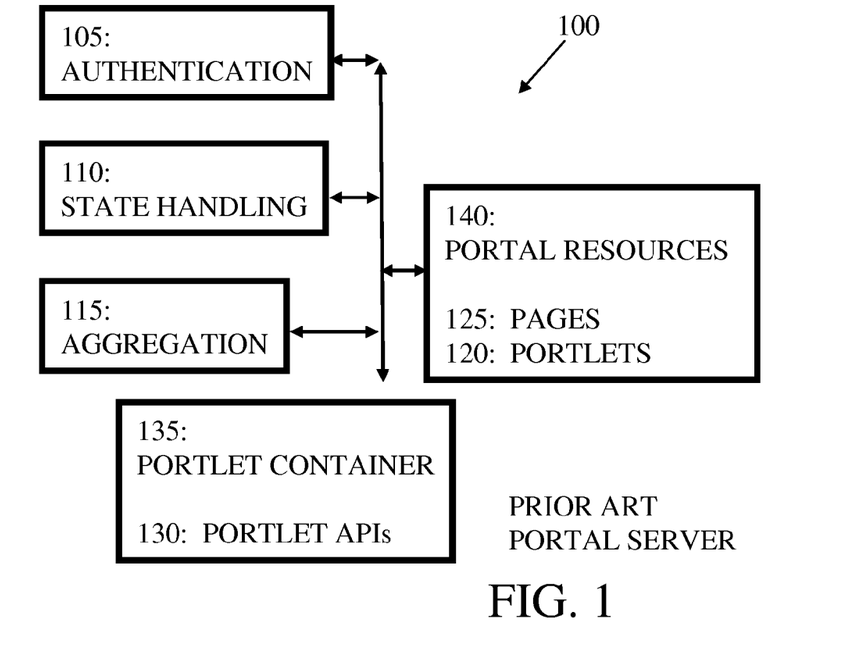
FIG. 1 is a schematic diagram illustrating essential structural components on a Portal web server according to prior art.

FIG. 1 gives a schematic system view on a web server implementing such prior art web Portal.

A prior art Portal as e.g., represented by above IBM WebSphere Portal or by Jetspeed2 Enterprise Portal is built by a complex functionality implemented on a network server—for example a web server 100, the most important of which are logic components for user authentication 105, state handling 110, aggregation 115 of fragments, a plurality of Portlets 120—further described below—provided in respective pages 125 with a respective plurality of APIs 130 to a respective Portlet container software 135 for setting them into the common web page context, and some Portal storage resources 140. The logic components are operatively connected such that data can be exchanged between single components as required. This is roughly depicted in FIG. 1.

In more detail, the Portal engine of the web server in FIG. 1 implements an aggregation of Portlets 120 based on the underlying Portal model and Portal information such as security settings, user roles, customization settings, and device capabilities. Within the rendered page, the Portal automatically generates the appropriate set of navigation elements based on the Portal model.

The Portal engine invokes Portlets during the aggregation as required and when required and uses caching to reduce the number of requests made to Portlets. The prior art IBM WebSphere Portal employs open standards such as the Java Portlet API (application programming interface). It also supports the use of a remote Portlet via the WSRP standard.

The Portlet container 135 is a single control component competent for all Portlets 120, which may control the execution of code residing in each of these Portlets. It provides the runtime environment for the Portlets and facilities for event handling, inter-Portlet messaging, and access to Portlet instance and configuration data, among others. The Portal resources 140 are in particular the Portlets themselves and the pages on which they are aggregated in form of an aggregation of fragments.

Figure 2:
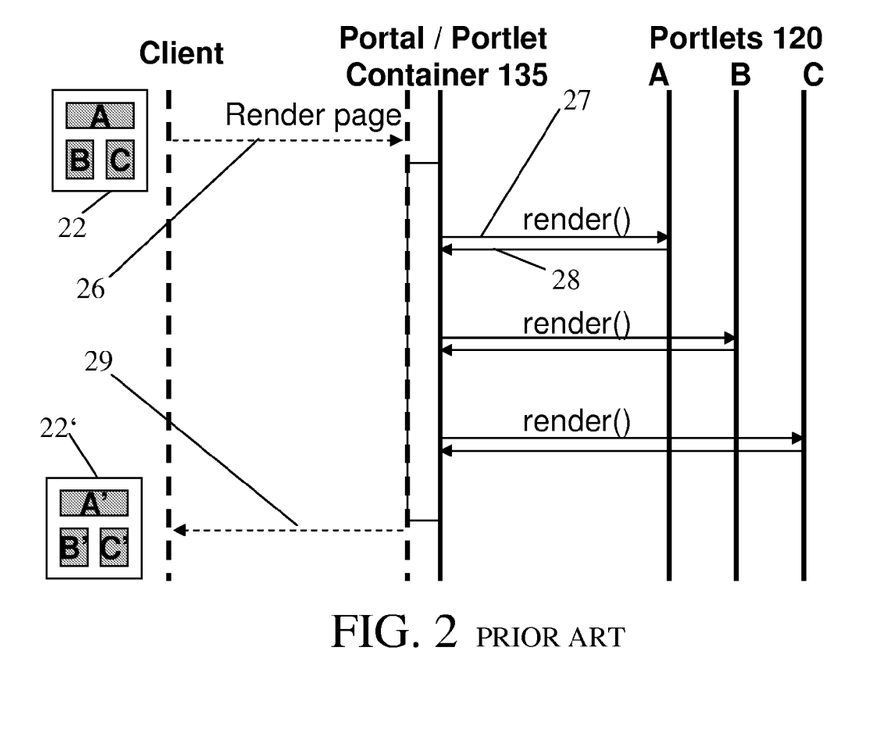
FIG. 2 is a schematic diagram illustrating the interactions in a Portal according to prior art during prior art render request processing.

FIG. 2 depicts prior art interactions in a Portal during the render request processing.

A client 22 is depicted left, depicting the display of the Portlet markup A, B, and C of respective Portlets in the client Browser. The Portal container 135 in the central portion and the diverse Portlets 120 ((A, B, C) are depicted right. The communication is based on requests which are expressed in the depicted arrows.

In particular, the client issues a render request 26, e.g. for a new page, by clicking on a "clickable item" displayed in its Browser window. To render this new page, the Portal—after receiving the render request 26—determines the respective Portlets on the page and sends an own render request 27 to each Portlet through the Portlet container 135, as implemented e.g. in above mentioned IBM Websphere product implemented thus as a Portal component.

In prior art, each Portlet A, B and C creates its own markup independently and returns the markup fragment with the respective request response 28. The Portal aggregates the markup fragments and returns the new page 22' to the client in a respective response 29.

As a person skilled in the art may appreciate the prior art Portal cannot control the layout of the content generated by a Portlet, i.e. the Portal cannot influence the format or layout of the Portlets markup fragment. This is disadvantageously a significant obstacle for implementing a consistent "look and feel" of a Web page containing multiple Portlets, since each Portlet independently chooses the layout or the format of its markup fragment, not taking into account the format of other fragments associated with other Portlets on the same Web site. Thus, the diverse formats and layouts of the Portlet representations in the Browser provide difficulties to a User at the Portal to utilize them in a simple single way.

1.3. OBJECTIVES OF THE INVENTION

It is thus an objective of the invention to provide a method according to the preamble of claim 1 with improved flexibility for the administration of a Portal which allows generating a consistent look and feel in a Portal.

2. SUMMARY AND ADVANTAGES OF THE INVENTION

This objective of the invention is achieved by the features stated in enclosed independent claims. Further advantageous arrangements and embodiments of the invention are set forth in the respective subclaims. Reference should now be made to the appended claims.

According to a basic aspect of the invention the Portal provides generally layout templates to the Portlets of the Portal. Each Portlet exploits this template information during its markup generation and thus incorporates the layout for the content prepared by the Portal into its own markup.

A template preferably contains a machine readable description that indicates its scope. The description may refer to a set of well-defined user interface elements (e.g. "OK Button", "header", "background graphics", "table with 4 columns").

Alternatively it may comprise more complex expressions in an appropriate language with defined semantics that specify when and what for the template should be used (e.g. "buttons on forms with more than 4 input fields").

Further, a template comprises a layout specification. This may be either a markup fragment (or multiple markup fragments) that can be incorporated into the Portlet output (e.g. an HTML fragment: <table width="100%" border=0 cellpadding=0 cellspacing=0>), or it may be an abstract layout specification with well-defined semantics, which is read and interpreted by the Portlet and contains instructions how the content and its layout should be generated (e.g. "arrange buttons on the right side of a form, one upon the other").

In order to render a user interface element, the Portlet checks if an appropriate template is available and—if so—uses the template to generate the output for this element by either adopting the template markup fragment(s) or following the instructions for output creation.

The advantages of this inventional approach are that this allows a consistent "look and feel" at the client-site displayed Website, as a single template can be used for all Portlets managed on the Portal. Even complex templates can be used that contain JavaScript and fragments of other scripting languages, or advertisements.

Additional preferred features and respective advantages are as follows:

When a function bibliotheca is provided for being accessed by the Portlet code, and this bibliotheca comprises the functions required for executing code described by said templates, an easy-to-manage implementation is provided, which can be applied multiply for many Portals.

Preferably, the Portlets use markup fragments provided by a Portal-central control component implementing said template means, as for example the Portlet container in the IBM Websphere Application.

When such control component and said Portlets share a predetermined XML name space, and said template means comprises instructions comprised of said name space for interpreting them, then a universally applicable implementation is found.

In a "static" implementation of the inventional method an initial template is provided to a Portal, when it is invoked for the first time, and update information is provided in later invocations.

In a "dynamic" implementation Portlet-owned markup is generated by said Portlet only in case a predetermined check condition run through by the Portlet code allows it, wherein the check condition's code resides in the code of the Portal control element. For this the advantage results that any control of a design-relevant Portlet-specific markup generation resides in the Portal control component.

When the markup code comprises executable code—e.g. JavaScript instructions—this enables for guaranteed and controlled execution of code in the template means, what is relevant specifically for paid banner displays in Portlets.

Further, the concept can be applied to local and remote Portlets. When the template means is transferred to a remote Portlet the advantage results that the method is also applicable to remote Portlets. The transfer may be done according WSRP.

When a render request 27 is enriched by an additional parameter reflecting the template means prescriptions, then the advantage results that the usual communication between Portal control and Portlet, as illustrated in FIG. 2, can be continued. i.e. the structure of the Portlet API 130 is not modified. This allows portlets not supporting this invention to run without modification.

Preferably, the layout template is managed by a GUI which is accessible by a Portal administrator. By that static or dynamic management can be selected freely and also an individual choice of a configuration for which specific Portlet a template is binding, can be easily implemented and easily managed, in cases, that exception to the general "look and feel" are demanded.

When the Portal component comprises additional logic for varying the template prescriptions, and said additional logic is run through in every render request, then the Portal acts autonomously; this allows dynamic changes possibly depending of the day-time, or depending of a user-level, etc. can be implemented easily.

3. BRIEF DESCRIPTION OF THE DRAWINGS

The present invention is illustrated by way of example and is not limited by the shape of the figures of the drawings in which.

4. DETAILED DESCRIPTION OF THE PREFERRED EMBODIMENT

Figure 3:
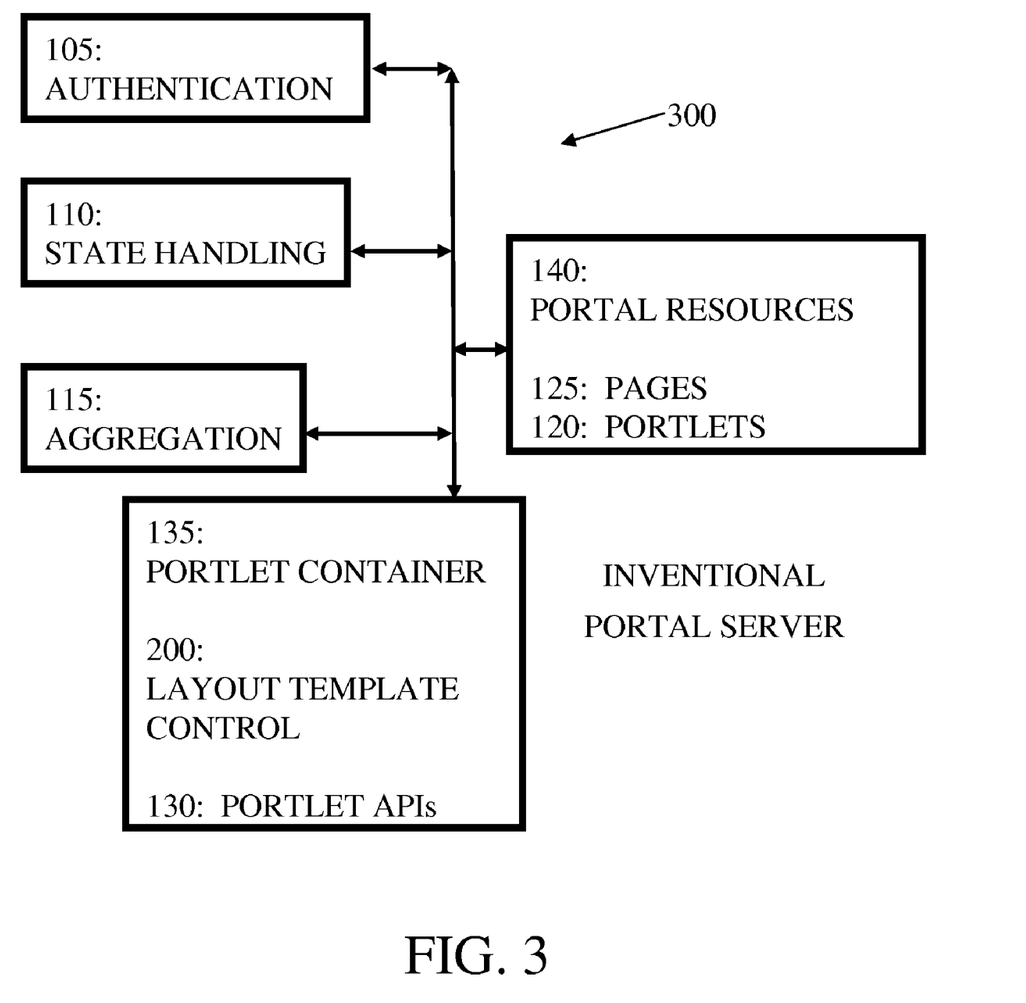
FIG. 3 is a system depiction according to FIG. 1, improved by a layout template control element according to the present invention.

With reference to FIG. 3 according to a preferred embodiment of the invention a layout template control software depicted with reference sign 200 is implemented within the Portal software. In this particular embodiment the control component 200 is implemented within the so-called Portlet container 135. The advantage of this location is that the Portlet container is provided with any interface required for the interaction to the Portlets 120. Thus, in particular the Portlet container 135 is enabled to invoke Portlets and vice versa, the Portlets can invoke a function within the Portlet container.

The rest of the structural components in FIG. 2 can be basically taken as they are and as they function in prior art, see FIG. 1.

Figure 4:
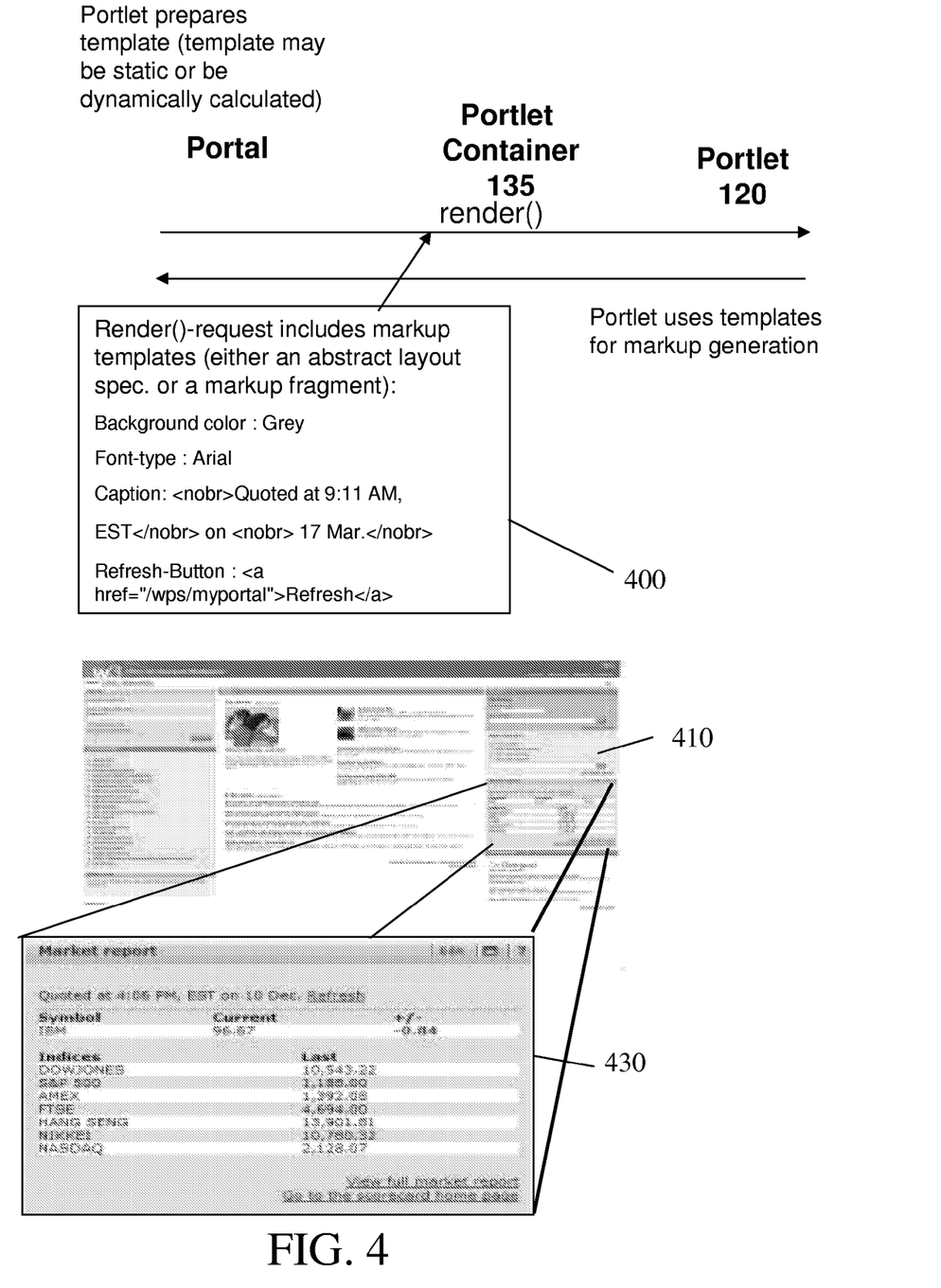
FIG. 4 is a zoom view on a render request/response pair 27, 28 in FIG. 2 illustrating a preferred embodiment of the inventional method.
Figure 5:
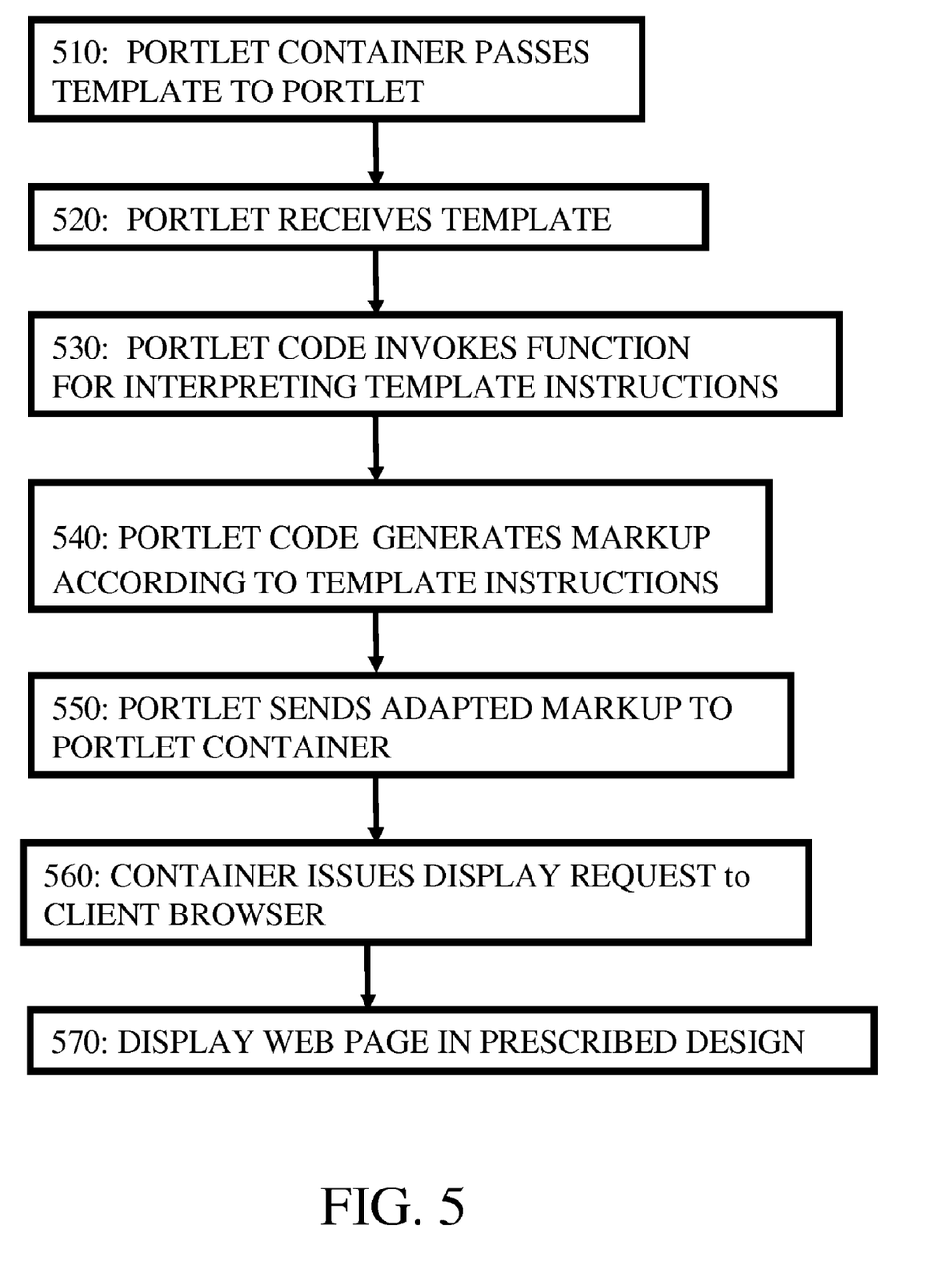
FIG. 5 is a schematic control flow diagrams used in a preferred embodiment of the inventional method, when implemented in a Portal-central way.

With further reference to FIGS. 4 and 5 more details are shown telling a person skilled in the art how a preferred way can be implemented in order to make the Portal software provide layout templates to a plurality of Portlets 120. A markup template 400 includes information on the shape of the web page influenced by the Portlets addressed in a preceding render request 26. The Portal container 135 passes this template in a step 510 to each of the Portlets of the Web page, to which a respective API exists. Generally this should be all Portlets in a Webpage.

Exemplary information is depicted in FIG. 4, as for example that the background colour must be grey, specifying a font-type "Arial" and specifying further information regarding a caption containing a button which references a link to "/wps/myportal" and which is being labelled "Refresh". The Portlet Container adds a request parameter to the render request which references an object containing a set of markup templates. The request parameter is identified by a well-known name and can be accessed by the Portlet through the operations of the Portlet API.

When the render request is received at the Portlet, see step 520, the Portlet software interprets with some dedicated logic the template instructions given in frame 400, step 530. The mark-up fragment resulting from the interpretation of this template layout information is shown in box 430, which forms a part of the total web page 410 of the Portal. Box 430 satisfies the requirements given in box 400, see the font type and the background colour. Then, in a step 540 the Portlet code generates its Markup fragments according to the prescriptions imposed by the template information. This adapted markup code is sent, step 550, via the portal container 135 in a display request back to the client Browser, step 560, where it is displayed, step 570, according to the "Look&Feel" as defined in the layout template 400. Of course, this is done for all Portlets having influence to the Look and Feel of the web page in question.

Other alternatives than template 400 for providing a binding, prescriptive rule for the Portlet code, to design its respective Portlet mark-up fragment, may include XML implementations, or script-level implementations which are interpreted by a respective interpreter means within a respective Portlet.

Those alternatives may include different variations as for example that the Portlet software just receives a bit flag telling it that a link must be followed and a respective function must be invoked by the Portlet software in order to receive respective layout instructions. A person skilled in the art may appreciate that there are multiple, diverse implementations possible to do.

In another variation the markup template does not include imperative or descriptive instructions that are interpreted by a Portlet, but consists of sample markup, e.g. markup retrieved by the Portal Container from another Portlet. In this variation the Portlet derives the rules for markup creation from the sample markup, i.e. retrieves formatting information by searching for the appropriate markup constructs (e.g. HTML keywords like "font", "table", etc.) and by extracting formatting parameters from the respective constructs. These formatting parameters are then used during markup generation.

In another variation a Portal Container provides markup templates to Portlets consumed via WSRP from a remote Portal.

In this variation, the markup templates are included in the render request being sent to the remote Portal (e.g. in an Extension element of the MarkupParams type as specified in the WSRP standard).

The templates or the prescriptive rules regarding the layout of the templates can be made available to the Portlets during runtime either during an initialisation step or during the real time request processing. FIG. 4 shows the latter case. When this is implemented to happen during initialisation then the advantage results that a smaller amount of information must be transported in each render request.

An exemplary application program interface (API) that provides the templates comprises preferably the following request parameters:

A request parameter named "MARKUP-TEMPLATES" references an object (e.g. of (Java) class Map) containing a set of markup templates. A Portlet developer may retrieve the request parameter and access the markup templates using the following code snippet:

```
Map templates = (Map) request.getParameter("MARKUP-
   TEMPLATES");
for (Iterator iter=map.entrySet( ).iterator( ); iter.hasNext( );)
{
         Map.Entry template = (Map.Entry) iter.next( );
      ... process template ...
   }
```

The inventional principle can be extended to comprise also variations which implement that the Portal can fully automatically and dynamically create templates without further human interaction. For example, a Portal may change its look&feel dependent of the type of user or the processing load on the Portal server in order to satisfy the varying needs of either the Portal visitor or the Portal provider. During times of peak load on the server, the Portal may specify markup templates that contain simple markup formatting and can be processed rapidly without creating a lot of additional processing load on the server. During times of small load on the server, the Portal may provide more complex markup templates. For this purpose the Portal contains functionality to measure the load of the Portal server and heuristics to reduce the complexity of the template markups depending on the server load.

A markup template may specify processing instructions that are to be interpreted by the Portlet Container and include conditions like

```
IF LOAD<0,5 THEN ...
   <a href=/special/service>Additional information</a>
ELSE
   <p>Info: Additional information is not available due to high
   load on the Portal server.</p>
ENDIF
```

The condition refers to a variable LOAD which states the actual processing load. The IF statement has the semantics that the markup instructions contained in the THEN block are provided to the Portlet, if the condition evaluates to TRUE. The instructions of the ELSE block are provided to the Portlet otherwise.

The condition may refer to well defined variables, e.g. LOAD, which are evaluated by the Portal (advantageously the state handling 110) or the Portal Container.

Figure 6A:
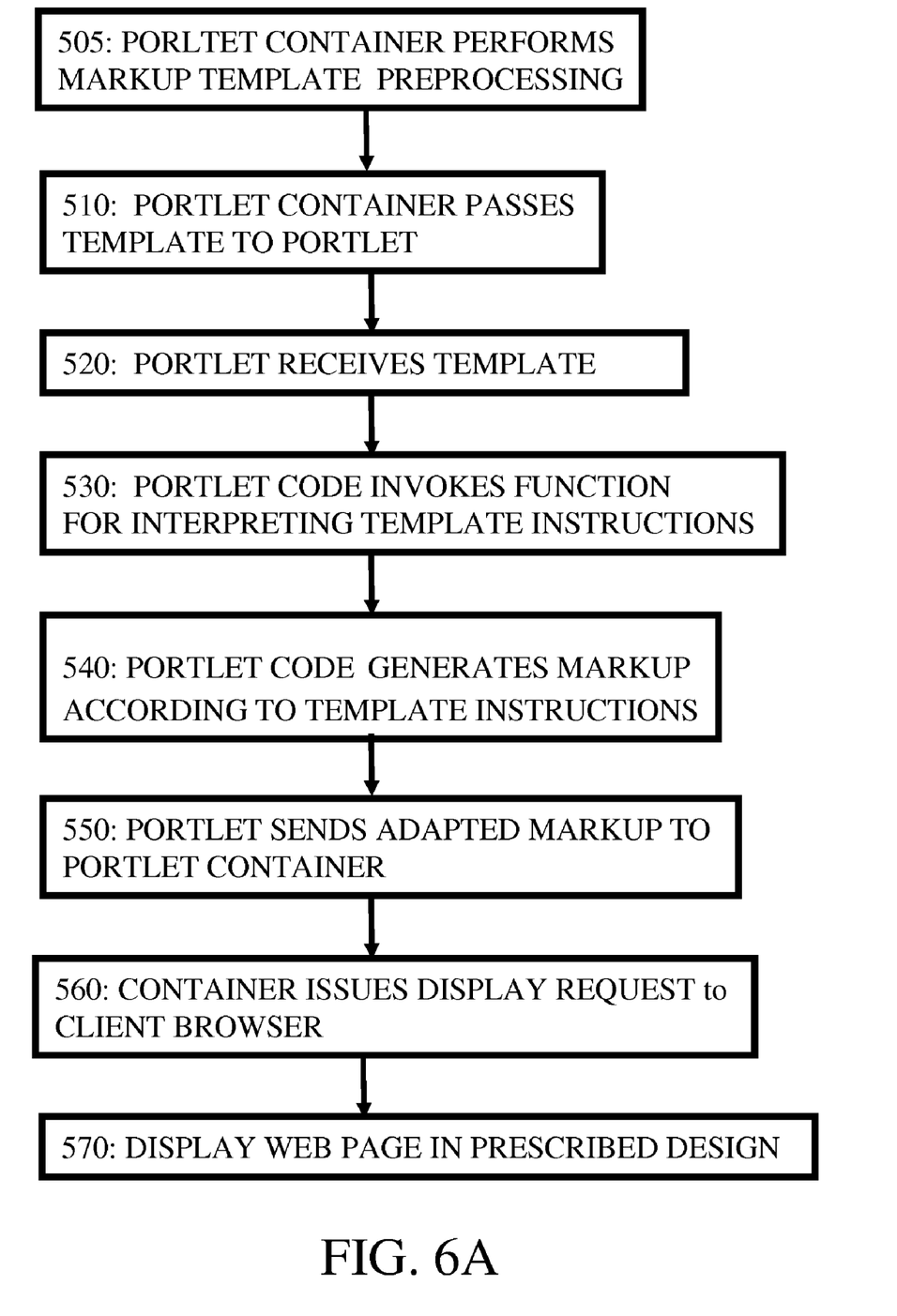
FIGS. 6A and 6B are schematic control flow diagrams used in a preferred embodiment of the inventional method including Markup Template Preprocessing, when implemented in a Portal-central way.
Figure 6B:
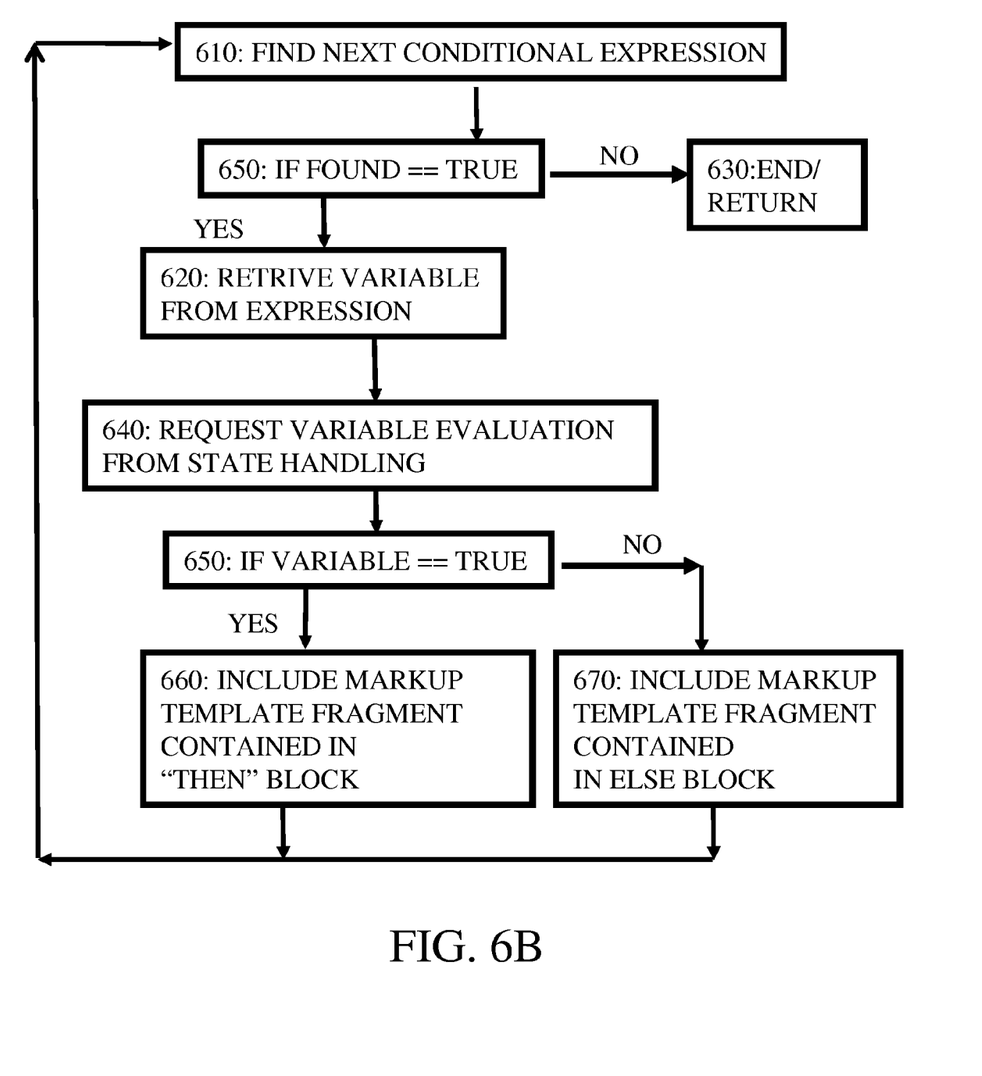

With reference to FIG. 6A the layout template control 200 is therefore extended to contain a markup template preprocessing functionality in a step 505 of which the details are depicted in FIG. 6B. The rest of the method steps are then identical to those of FIG. 5. In particular and according to FIG. 6B, during step 505 the layout template control 200 parses the markup template, identifies conditional expressions in steps 610, 615, retrieves the variable from an expression in step 620 and evaluates the conditions in a step 640 by requesting its evaluation from the state handling engine 110 of the portal.

Then it processes the markup according to the evaluation result what yields to a decision 650 and its execution in executing the instructions given by a respective "Then"—Block in step 660 or those of a ELSE Block in step 670. Thereafter the next condition is parsed and evaluated by branching the control back to step 610.

In another variant, the Portal implements a user categorization and assigns each user to one or multiple categories. The Portal Container may create specific markup templates for each category. This in turn results in markup which is selectively adapted for each category of user. For example, a business user who pays for Portal access and a personal user who does not pay, but instead accepts to see advertising, may be presented different markups. For example, the markup templates embed a condition referring a variable USER-TYPE that identifies the user category. The following sample markup template includes a link to an advertisement only for non-business users.

```
if USER-TYPE="non-business" THEN
   <a
   href=http://advertisement.com/advertisement>Advertisement</a>
   ENDIF
```

The present invention can be realized in hardware, software, or a combination of hardware and software. A template control tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following
a) conversion to another language, code or notation;
b) reproduction in a different material form.

The invention claimed is:

1. A computer method of controlling the layout of markup fragments of Portlets aggregated in web pages comprising:
   a) providing a Portal control component in a subject web portal, the subject web portal having a web page aggregating a plurality of Portlets
   b) providing a layout template comprising a layout specification of GUI-elements to be generated by the Portlets;
   c) using the portal control component to pass the layout template to each of the Portlets; and
   d) using the Portlets generating markup fragments according to prescriptions of said layout template such that layout of markup fragments cause a consistent look and feel at client-sites of web pages of the subject web portal;
   wherein the Portal control component comprises additional logic for varying the prescriptions of the layout template, wherein said additional logic is run through in every render request;
   and wherein the additional logic comprises evaluation of conditions.

2. The method according to claim 1, wherein a function bibliotheca is provided for being accessed by the Portlet, comprising the functions required for executing code described by said layout template.

3. The method according to claim 1, wherein said Portlets use markup fragments, provided by said Portal control component, implementing said layout template.

4. The method according to claim 1, wherein said Portal control component and said Portlets share a predetermined XML name space, and said layout template comprises instructions comprised of said name space for interpreting them.

5. The method according to claim 1, wherein an initial template is provided to the subject web Portal, when it is invoked for the first time, and update information is provided in later invocations.

6. The method according to claim 1, wherein a Portlet-owned markup is generated by a respective one of said Portlets in case a predetermined check condition run through by the one Portlet allows it, wherein the check condition's code resides in the Portal control component.

7. The method according to claim 1, wherein the layout template comprises executable code.

8. The method according to claim 1, wherein said layout template is transferred to a remote Portlet.

9. The method according to claim 1, wherein a render request is enriched by an additional parameter reflecting the layout template prescriptions.

10. The method according to claim 1, wherein the layout template is managed by a graphical user interface (GUI) accessible by a Portal administrator.

11. A portal server computer system comprising:
    portal control component controlling layout of markup fragments of a plurality of Portlets aggregated in a subject web page of a web Portal; and
    a layout template comprising a layout specification for GUI-elements to be generated by the Portlets, wherein the portal control component passes the layout template to each of the Portlets, and the Portlets generate markup fragments according to specification of the layout template such that layout of the markup fragments cause a consistent look and feel at client-sites of the subject webpage;
    wherein the Portal control component comprises additional logic for varying the prescriptions of the layout template, wherein said additional logic is run through in every render request;
    and wherein the additional logic comprises evaluation of conditions.

12. A computer Portlet apparatus comprising:
    given a portal server system controlling the layout of markup fragments of a plurality of Portlets aggregated in web pages of a subject web Portal,
    a) a functional component providing a template means to said Portlets,
    b) wherein the template means comprises a layout specification for GUI-elements to be generated by the Portlets, and
    c) Portlet interpretation logic interpreting the layout specification and each Portlet, wherein the Portlets generate a markup code according to prescriptions of said template means, including layout of markup fragments of the Portlets that results in a consistent look and feel at client-sites of web pages of the subject web portal;
    wherein the functional component comprises additional logic for varying the prescriptions of the layout template, wherein said additional logic is run through in every render request;
    and wherein the additional logic comprises evaluation of conditions.

13. A computer Portlet method comprising:
    a) receiving a layout template as prescribed by a control component of a portal server aggregating a plurality of portlets in a subject web page, said receiving being at each portlet of the plurality,
    b) from the received layout templates, interpreting a layout specification for GUI-elements to be generated by the Portlets, and
    c) generating markup fragments according to prescriptions of said layout template in a manner such that layout of the markup fragments cause a consistent look and feel at client-sites of the subject web page; wherein the Portal control component comprises additional logic for varying the prescriptions of the layout template, wherein said additional logic is run through in every render request;
    and wherein the additional logic comprises evaluation of conditions.

14. A computer program product comprising:
a computer usable storage medium having a computer readable program for controlling the layout of markup fragments of a plurality of Portlets aggregated in web pages of a subject web Portal,
the computer readable program having program code which when executed on a computer causes the computer to have:
a) a Portal control component providing a layout template to said Portlets,
b) wherein the layout template comprises a layout specification for GUI-elements to be generated by the Portlets, and
c) wherein the Portlets generate a markup code according to prescriptions of said layout template, including layout of markup fragments of the Portlets that results in a consistent look and feel at client-sites of web pages of the subject web portal;
wherein the Portal control component comprises additional logic for varying the prescriptions of the layout template, wherein said additional logic is run through in every render request;
and wherein the additional logic comprises evaluation of conditions.

\* \* \* \* \*